Patented Jan. 2, 1934

1,941,640

UNITED STATES PATENT OFFICE 1,941,640

METHOD OF PREPARING ALIPHATIC KETONES

Donald K. Tressler, Gloucester, Mass., assignor to The Mathieson Alkali Works, Incorporated, New York, N. Y., a corporation of Virginia No Drawing. Application August 10, 1931
Serial No. 556,322

9 Claims. (Cl. 260—134)

This invention relates to an improved method of preparing ketones from unsaturated higher fatty acids whereby a high yield of ketones of improved quality is obtained.

It has heretofore been proposed to produce aliphatic ketones by heating higher fatty acids to a high temperature with small amounts of catalysts. Easterfield and Taylor describe in the Journal of the Chemical Society, vol. 99 (1911) beginning on page 2298, a method whereby satisfactory yields can be obtained in the case of higher saturated fatty acids such as stearic acid, but according to their description in the case of unsaturated higher fatty acids a yield of only ten percent was obtained by them. I have heated unsaturated higher fatty acids such as oleic, linoleic, etc. acids with a finely divided metal or metallic oxide in much the same manner as that described in this publication and I obtained a mixture of tarry matter containing only a small percentage of the ketones from which the ketones could be separated only with difficulty. No more than a small yield can be obtained by this method.

The poor yields of ketones obtained from the higher unsaturated fatty acids by heating them to a high temperature with a catalyst is due, at least in great measure, to the absorption of oxygen by the hot reaction mass, and I have found that high yields are obtainable only if the acids are heated and converted to the ketones under non-oxidizing conditions. The formation of ketones from fatty acids by heating with a catalyst is accompanied by the liberation of carbon dioxide and water. The liberation of carbon dioxide, however, is not uniform throughout the operation and unless an inert atmosphere is maintained by bubbling a non-oxidizing gas thru the reaction mixture or otherwise introducing a non-oxidizing gas into the reaction vessel in such a way as to exclude the air throughout the duration of the reaction and prevent oxidation of the unsaturated acid and its reaction products, only an unsatisfactory small yield of the ketone can be produced. However, by maintaining non-oxidizing conditions by the introduction of a non-oxidizing gas into the reaction vessel a yield of fifty percent or as much as seventy-five or eighty or more of a ketone can be obtained from the corresponding unsaturated higher fatty acid.

The maintenance of non-oxidizing conditions within the reaction vessel throughout the reaction is essential to obtaining a high yield of ketone from an unsaturated higher fatty acid, and even commercial stearic acid contains enough unsaturated material to produce an inferior product unless the reaction is carried out in a non-oxidizing atmosphere as described in the application.

One advantageous manner of maintaining a non-oxidizing atmosphere in contact with the reaction mixture is to carry out the process in a loosely covered vessel and bubble an inert gas thru the reaction mixture so as to sweep out the air and prevent air from coming into contact with the reaction mass in the vessel and also thereby to assist the agitation of the reaction mass and the distribution of the catalyst throughout the reaction mixture.

The temperatures employed in the present process are high temperatures, for example up to around 300° C. or higher. At such high temperatures the higher unsaturated fatty acids can be converted into the corresponding ketones in the presence of a catalyst such as a finely divided metal or metallic oxide, or a mixture of metals or oxides, or a silicate or silicates either alone or deposited on some inert porous material such as infusorial earth.

I have found, for example, that by heating oleic acid in a loosely covered vessel at about 310° C., for about 2½ hours with about five to ten percent of finely divided oxide of iron such as rouge and passing carbon dioxide thru the apparatus before bringing the acid to the reaction temperature to sweep out the air and maintaining a non-oxidizing condition within the vessel by introducing carbon dioxide into it throughout the reaction period, a yield of 80 or even 90% or more of the theoretical yield of oleone can be obtained. After the ketonization of the acid begins a tendency toward foaming will be noticed. The amount of foaming is variable and is affected in part by the rate at which the acid is heated. I have found that the rate of heating should be that at which the mixture of acid with catalyst is kept vigorously seething but does not foam violently. After the reaction has been completed and the catalyst has been separated by filtration, the crude oleone obtained is only slightly darker in color than the original oleic acid whereas if carbon dioxide is not introduced into the reaction vessel in sufficient quantity to maintain non-oxidizing conditions the product will be a black viscous syrup from which only a small yield of oleone can be separated and this only after repeated crystallizations.

The present invention is applicable not only to the individual unsaturated fatty acids but to mixtures thereof or mixtures with saturated fatty acids. Two or more unsaturated fatty acids can, for example, be heated with iron or finely divided iron oxide in a non-oxidizing atmosphere, or a mixture of saturated and unsaturated fatty acids can be similarly treated. For example, if a mixture of oleic and stearic acids in equimolecular proportions is treated in this way a mixture of the oleo-stearo-ketone, oleone and stearone is obtained in about the following proportions, namely 40% of oleo-stearo-ketone, 30% oleone and 30% stearone, although these proportions may vary somewhat.

The following more detailed description and examples will further illustrate the invention. The parts are by weight.

*Example 1.*—1500 parts of the commercial grade of oleic acid, known as double-distilled red oil, were placed in a distilling vessel provided with means for the introduction of a non-oxidizing gas such as carbon dioxide. 75 parts of finely divided reduced iron was stirred into the acid. The vessel was then closed except for a small opening sufficient to permit the escape of air and gas. The vessel was heated while carbon dioxide was bubbled thru the acid in a quantity sufficient to maintain a non-oxidizing atmosphere in contact with the reaction mass. When the temperature reached 200° C. it was held at that point until the tendency toward foaming had practically disappeared, which was two hours. The temperature was then slowly raised to 310° C. and held at that point with stirring until the reaction was substantially completed. This was indicated by the reduction of the acid number of the reaction mixture to 2 or lower. This step required 2½ hours but may require longer if foaming is encountered. The introduction of carbon dioxide into the reaction mixture was maintained continuously throughout the reaction and aided in agitating the mass. The heating was discontinued and the product allowed to cool in the atmosphere of carbon dioxide until the temperature was approximately 100° C. It was then filtered to remove the catalyst. A nearly complete conversion of fatty acids to ketones was obtained and less than one percent of fatty acids calculated as oleic acid remained in the reaction mixture at the end of the reaction.

*Example 2.*—200 parts of commercial double-distilled oleic acid were placed in a vessel provided with means for bubbling carbon dioxide gas into the reaction mixture and a vent opening for permitting escape of the excess gas and of gases and vapors generated by the process. 20 parts of rouge (finely divided oxide of iron) were added and carbon dioxide gas bubbled thru the acid to sweep out the air. The vessel was then heated to 200° C. and held at this temperature for about two hours and then raised to 320° C. at which point it was kept for a further period of around two hours or somewhat longer. Foaming prolongs the time required for completing the reaction. The heating was then discontinued and the contents allowed to cool to 100° C., when the passage of the carbon dioxide gas thru the reaction vessel was stopped and the product was removed from the vessel and filtered. The crude product was recrystallized from a mixture of ethyl and isopropyl alcohol and gave a yield of ketones representing about 83% of the theoretical yield.

The ketones produced according to the process of the present invention consist of waxy properties which make them suitable for many purposes. Stearone, a saturated aliphatic ketone, is a fairly hard waxy substance melting at about 87.8°. Oleone is much softer and has a much lower melting point. It is suited for most uses where a soft low melting wax is required. Oleostearone is intermediate in properties between oleone and stearone and may be employed, for example, as a substitute for intermediate waxes such as beeswax.

It will thus be seen that the present invention provides an improved process for producing ketones which are valuable wax substitutes and which are adapted for other purposes and provides a process whereby the higher unsaturated fatty acids or mixtures of the higher unsaturated and higher saturated fatty acids may be converted to ketones with excellent yields of ketones of high purity and with the avoidance of the formation of large quantities of undesirable by-products.

It will further be seen that the invention is characterized by the absence of air during the conversion of the acid to the ketone, which absence is insured by removing air from the apparatus at the outset and maintaining a non-oxidizing atmosphere throughout the process by the passage of a stream of inert gas thru the reaction mixture or vessel or both. During the conversion of a fatty acid to a ketone by heating with a catalyst, some carbon dioxide is evolved but this evolution of carbon dioxide is not uniform throughout the reaction period and it does not maintain the non-oxidizing conditions necessary for obtaining the high yield of ketones contemplated by this invention.

I claim:

1. The method of producing ketones from higher unsaturated fatty acids which comprises heating the higher unsaturated fatty acids from natural fats to a high temperature in the presence of a ketone-forming catalyst while bringing a non-oxidizing gas into contact with the reaction mixture to maintain it under non-oxidizing conditions from before the time the reaction commences until after the reaction is complete.

2. The method of producing ketones from higher unsaturated fatty acids from natural fats, which comprises heating the unsaturated fatty acids to a high temperature in the presence of a ketone-forming catalyst while bubbling carbon dioxide continuously thru the reaction mass from before the time the reaction commences until after the reaction is complete to insure substantial absence of air during the process and to aid in agitating the mass.

3. The method of producing ketones from an unsaturated fatty acid from a natural fat which comprises heating the acid to a high temperature in the presence of finely divided metal as a catalyst while bringing a non-oxidizing gas into contact with the reaction mixture to maintain it under non-oxidizing conditions from before the time the reaction commences until after the reaction is complete.

4. The method of producing ketones from an unsaturated fatty acid from a natural fat which comprises heating the acid to a high temperature in the presence of finely divided metallic oxide as a catalyst while bringing a non-oxidizing gas into contact with the reaction mixture to maintain it under non-oxidizing conditions from before the time the reaction commences until after the reaction is complete.

5. The method of producing ketones from an unsaturated fatty acid from a natural fat which comprises heating the acid to a high temperature in the presence of a silicate as a catalyst while bringing a non-oxidizing gas into contact with the reaction mixture to maintain it under non-oxidizing conditions from before the time the reaction commences until after the reaction is complete.

6. The method of producing a ketone from oleic acid which comprises heating the acid to a high temperature in the presence of a ketone-forming catalyst while bringing a non-oxidizing gas into contact with the reaction mixture to maintain it under non-oxidizing conditions from before the time the reaction commences until after the reaction is complete.

7. The method of producing a ketone from oleic acid which comprises heating the acid to a high temperature in the presence of finely divided metal as a catalyst while bringing a non-oxidizing gas into contact with the reaction mixture to maintain it under non-oxidizing conditions from the time the reaction commences until the reaction is complete.

8. The method of producing a ketone from oleic acid which comprises heating the acid to a high temperature in the presence of a finely divided oxide as a catalyst while bringing a non-oxidizing gas into contact with the reaction mixture to maintain it under non-oxidizing conditions from before the time the reaction commences until after the reaction is complete.

9. The method of producing a ketone from oleic acid which comprises heating the acid to a high temperature in the presence of a silicate as a catalyst while bringing a non-oxidizing gas into contact with the reaction mixture to maintain it under non-oxidizing conditions from before the time the reaction commences until after the reaction is complete.

DONALD K. TRESSLER.